(12) United States Patent
Howard et al.

(10) Patent No.: US 7,598,635 B2
(45) Date of Patent: Oct. 6, 2009

(54) DYNAMO ELECTRIC MACHINE

(75) Inventors: Darren Christopher Howard, Aylesbury (GB); Lyndon Paul Fountain, Buckingham (GB)

(73) Assignee: Goodrich Control Systems Limited (GB)

( * ) Notice: Subject to any disclaimer, the term of this patent is extended or adjusted under 35 U.S.C. 154(b) by 339 days.

(21) Appl. No.: 11/563,755

(22) Filed: Nov. 28, 2006

(65) Prior Publication Data

US 2007/0120429 A1 May 31, 2007

(30) Foreign Application Priority Data

Nov. 29, 2005 (GB) .................................. 0524363.9

(51) Int. Cl.
*H02K 3/24* (2006.01)
*H02K 1/32* (2006.01)
*H02K 3/48* (2006.01)

(52) U.S. Cl. ........................... 310/61; 310/54; 310/216; 310/269

(58) Field of Classification Search .................. 310/61, 310/269, 54, 216
See application file for complete search history.

(56) References Cited

U.S. PATENT DOCUMENTS

| 2,787,721 | A | * | 4/1957 | Tudge | 310/61 |
| 3,480,810 | A | * | 11/1969 | Potter | 310/54 |
| 3,596,120 | A | * | 7/1971 | Potter | 310/41 |
| 6,791,230 | B2 | * | 9/2004 | Tornquist et al. | 310/61 |
| 7,015,616 | B2 | * | 3/2006 | Doherty et al. | 310/194 |

FOREIGN PATENT DOCUMENTS

| GB | 1 335 698 | 11/1970 |
| GB | 1 381 109 | 12/1971 |
| GB | 2 406 001 | 8/2004 |
| GB | 2 425 662 | 4/2005 |
| SU | 409339 | 4/1974 |

OTHER PUBLICATIONS

British Patent Office Search Report, Feb. 21, 2007.

* cited by examiner

*Primary Examiner*—Burton Mullins
(74) *Attorney, Agent, or Firm*—Andrus, Sceales, Starke & Sawall, LLP

(57) ABSTRACT

A rotor for a dynamo electric machine comprises a rotor body 12 defining a plurality of poles in the form of limbs 16 around which windings 18 are provided, and a wedge arrangement 20 spanning the space 42 between adjacent limbs 16 and serving to secure the windings 18 in position, and a discharge passage 44 for delivering coolant to the said space.

10 Claims, 3 Drawing Sheets

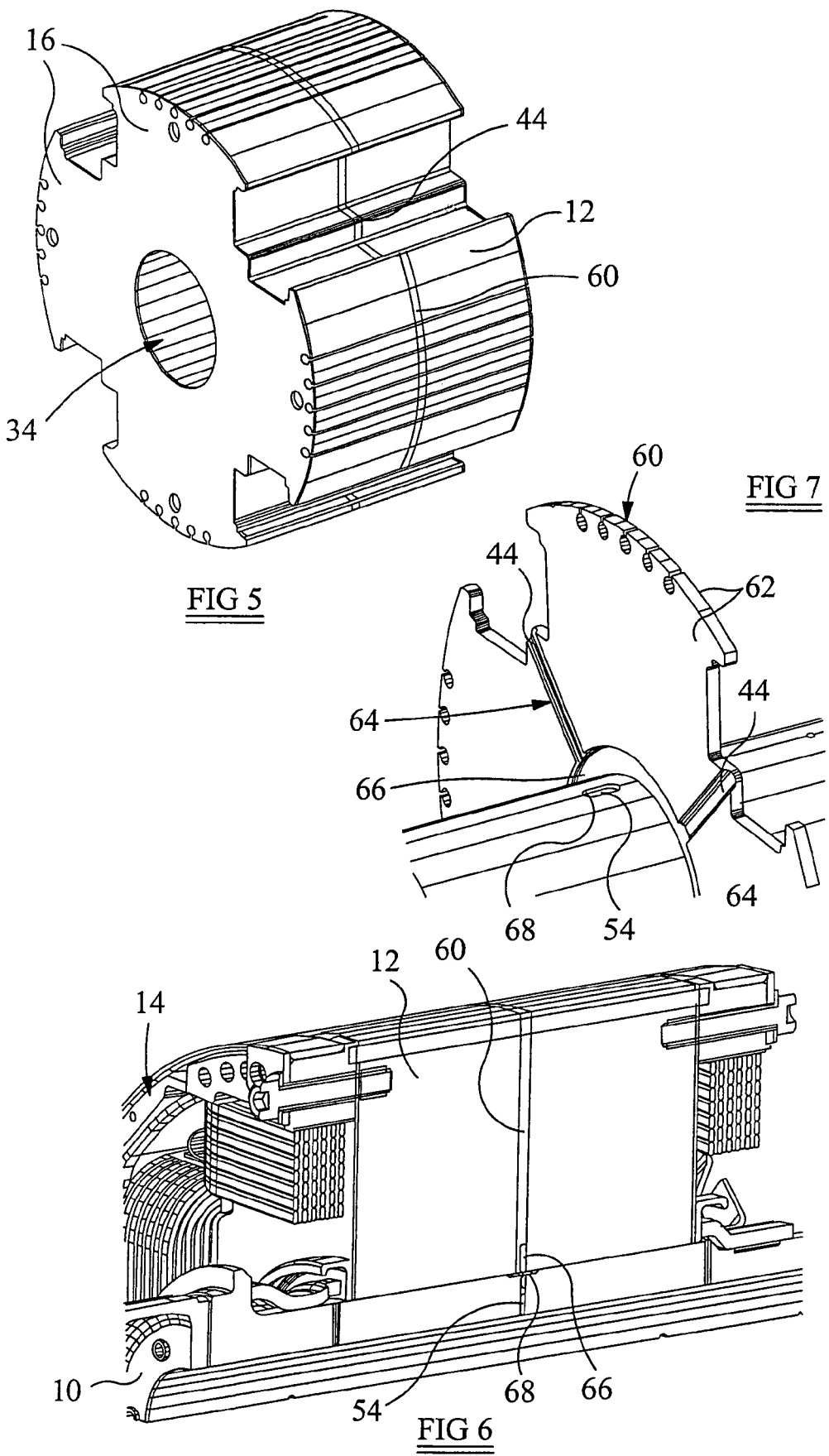

ns of the rotor. In the completed rotor body 12, each limb 16 has a coolant passage extending therethrough, the coolant passage extending parallel to the axis of the rotor shaft 10.

DYNAMO ELECTRIC MACHINE

This invention relates to a dynamo electric machine and in particular to an electrical motor and/or generator. The electrical motor and/or generator is suitable for use in aerospace applications, but could potentially be used in other applications.

A known form of dynamo electric machine comprises a laminated rotor core mounted for rotation within a stator. A series of windings are carried by the rotor, primary and secondary wedges co-operating with the rotor core and the windings to secure the windings in position against the high centrifugal forces experienced by parts of the machine, in use. For example, in use, the rotor may rotate at speeds of up to 20,000 rpm.

In use, heat is generated in the windings. In order to remove heat from the region surrounding the windings, relatively cool oil is allowed to flow or splash onto the exposed end parts of the windings which overhang the ends of the rotor laminations. Although this cooling technique can be effective in controlling the temperature of the exposed end parts of windings, little or no direct cooling occurs at parts of the windings located intermediate the exposed end parts, and the requirement to avoid excessive temperatures in the windings reduces the machine efficiency.

A number of arrangements are known in which passages are provided in a rotor body to allow a coolant to be passed through the rotor body to cool the rotor body. Arrangements of this type are described in, for example, GB 2099229, U.S. Pat. No. 4,365,178, JP 09150345 and U.S. Pat. No. 5,986,366. Although such arrangements may allow satisfactory cooling of the rotor body itself, they do not enable direct cooling of the high power density winding configuration. Unless heat from the windings dissipates into the rotor body, and such heat dissipation is thought to be limited, even indirect cooling of the windings does not occur.

According to the present invention there is provided a rotor for a dynamo electric machine, the rotor comprising a rotor body defining a plurality of poles around which windings are provided, adjacent ones of the poles defining a space therebetween, and a wedge arrangement spanning the space between adjacent poles and serving to secure the windings in position, and a discharge passage for delivering coolant to the said space.

The rotor body may incorporate a coolant passage which extends substantially parallel to the axis of the body adjacent the said space, the discharge passage communicating with the coolant passage to deliver coolant from the coolant passage to the said space.

By locating the coolant passage adjacent the said space, it can be positioned so as to have minimal effect upon the electrical operation of the rotor.

The wedge arrangement conveniently serves to divert coolant fluid from the said space into the windings.

Such an arrangement is advantageous in that coolant fluid can be supplied to the windings at a position intermediate the ends of the rotor. The fluid can flow along the windings to the ends of the rotor and serve to cool the intermediate parts of the windings, thus generating a uniform flow of cooling fluid axially disbursed throughout both ends of the rotor.

The rotor body is conveniently of laminated form, the coolant passage being defined by aligned apertures stamped into the individual lamina elements.

One end of the coolant passage may be closed by an end plate, the other end being closed by a distribution plate formed with grooves defining passages to allow the distribution of coolant fluid to the coolant passage. An annulus situated in the end plate ensures minimum oil flow quantity to distribute oil symmetrically to all poles of the rotor.

Preferably the rotor contains several said spaces, and each said space has a coolant passage and discharge passage associated therewith.

Alternatively, where the rotor body is of laminated form, the discharge passage may be defined by a groove formed in a surface of a plate located within the rotor body. The groove conveniently extends from a central opening of the plate to the outer periphery thereof and preferably extends radially, although other configurations may be possible.

The advantages described hereinbefore are also applicable to this arrangement as cooling fluid can be supplied to intermediate parts of the windings to provide a cooling flow along the windings.

The coolant fluid may be oil.

The invention also relates to a dynamo electric machine comprising a stator and a rotor supported for rotation relative to the stator, the rotor taking the form defined hereinbefore.

The invention will further be described, by way of example, with reference to the accompanying drawings, in which:

FIG. 5 is a perspective view of an alternative rotor design;

FIG. 6 is a sectional view of part of the rotor of FIG. 5; and

FIG. 7 is a view illustrating part of the rotor of FIGS. 5 and 6.

Figure 1:
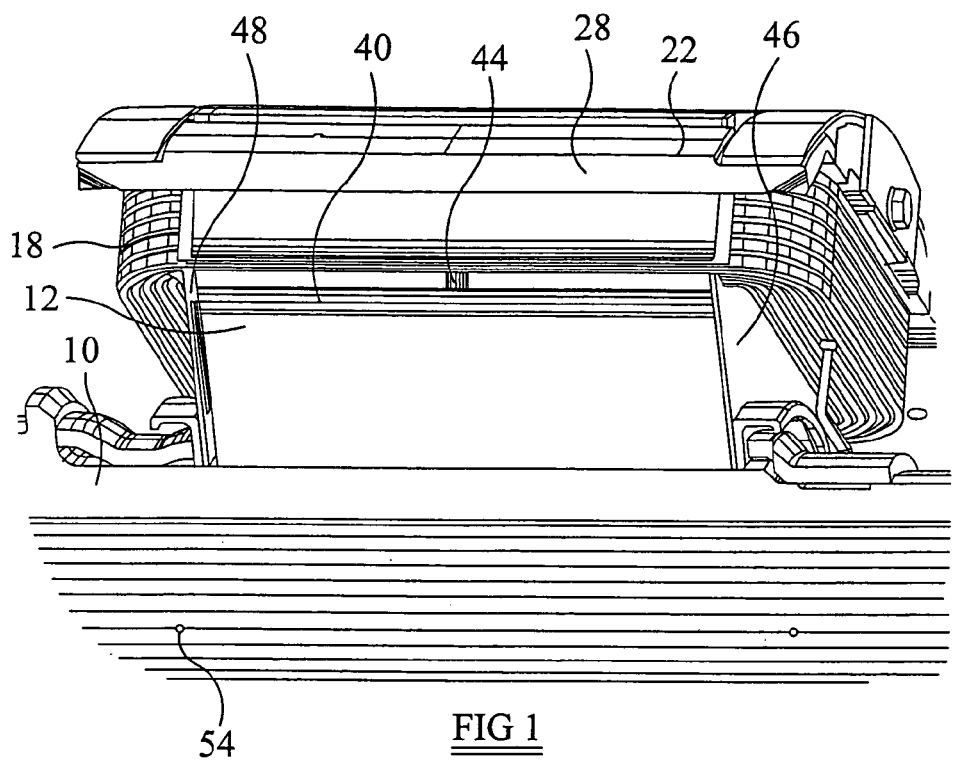
FIG. 1 is a diagrammatic perspective view of part of a rotor of a dynamo electric machine.
Figure 2:
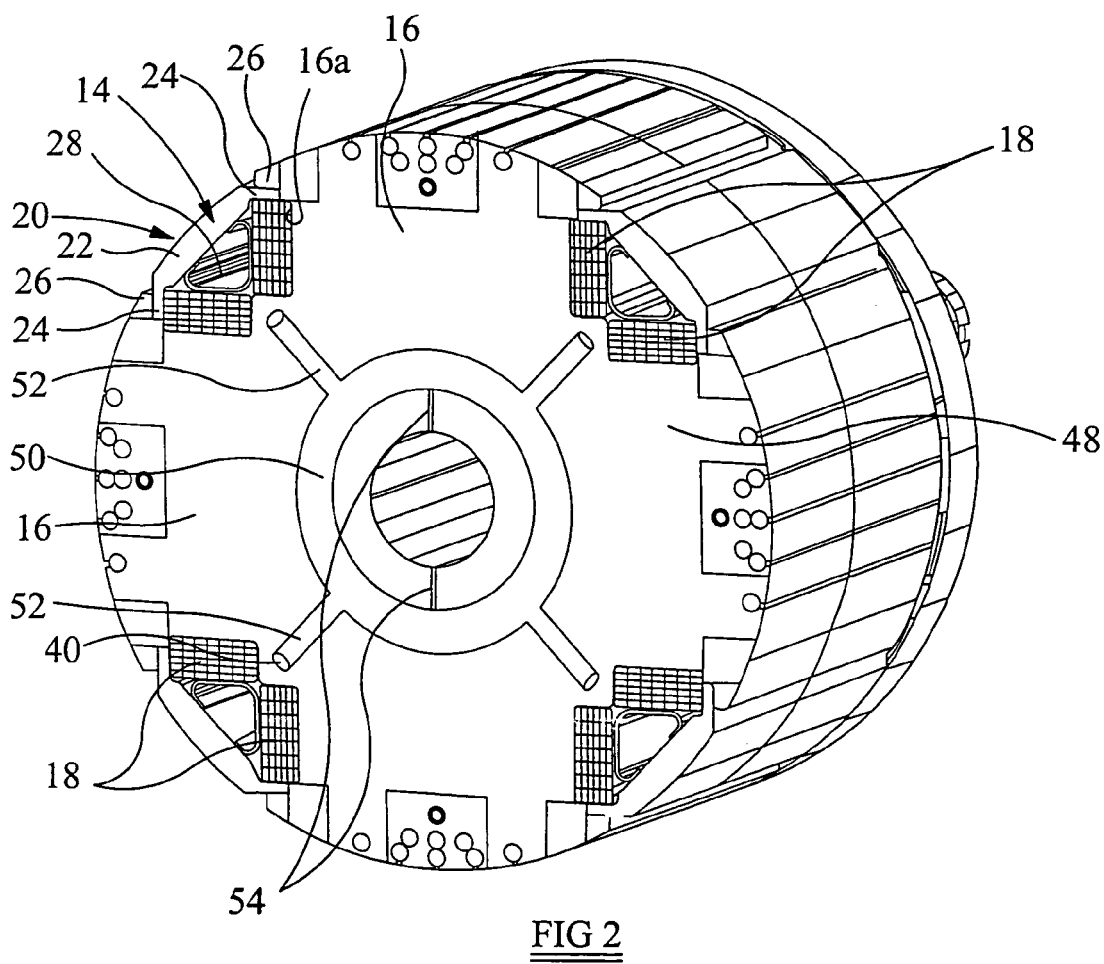
FIG. 2 is a sectional view of the rotor of FIG. 1.
Figure 4:
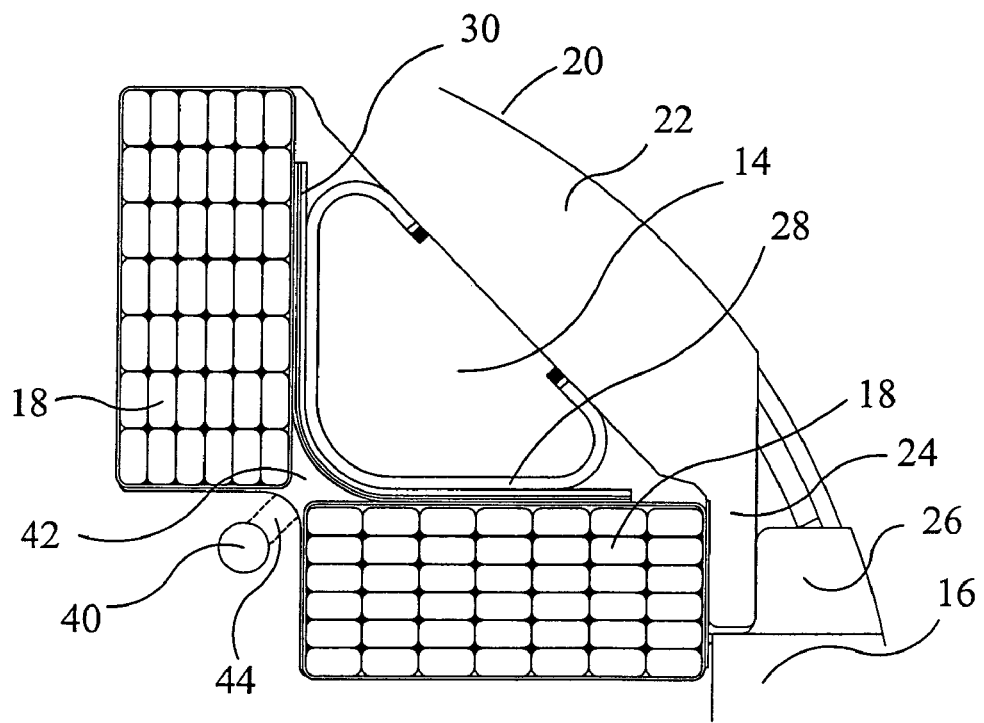
FIG. 4 is a diagrammatic sectional view illustrating part of the rotor.

FIGS. 1 and 2 illustrate part of a rotor for use in conjunction with the stator of a dynamo electric machine, and in particular to a dynamo electric machine intended to be rotated at high speed, in use. The rotor illustrated in FIGS. 1 and 2 comprises a rotor shaft 10 upon which is mounted a laminated rotor body 12. The rotor body 12 is formed with four equiangularly spaced grooves 14 and thus includes four equiangularly spaced poles or limbs 16 around which windings 18 are formed. It will be appreciated that other designs have a greater or smaller number of limbs are possible. As illustrated, the windings 18 sit, partially, in recesses 16a formed in the 'sides' of the limbs 16. The windings 18 are secured in position by means of wedge arrangements 20 of substantially conventional form. The wedge arrangements 20 each comprise an outer or primary wedge 22 having extremities 24 located so as to bear against lips 26 formed at the radially outer parts of the limbs 16 so as to secure the primary wedges 22 against the centrifugal forces which act thereon, in use. Secondary wedges 28 are located radially inwardly of the primary wedges 22, the secondary wedges being clamped between the outwardly presented surfaces of the windings 18 and the primary wedges 22 so as to resist movement of the windings 18. As illustrated in FIG. 4, a layer of an electrically insulating material 30 is interposed between each secondary wedge 28 and the associated windings 18.

Figure 3:
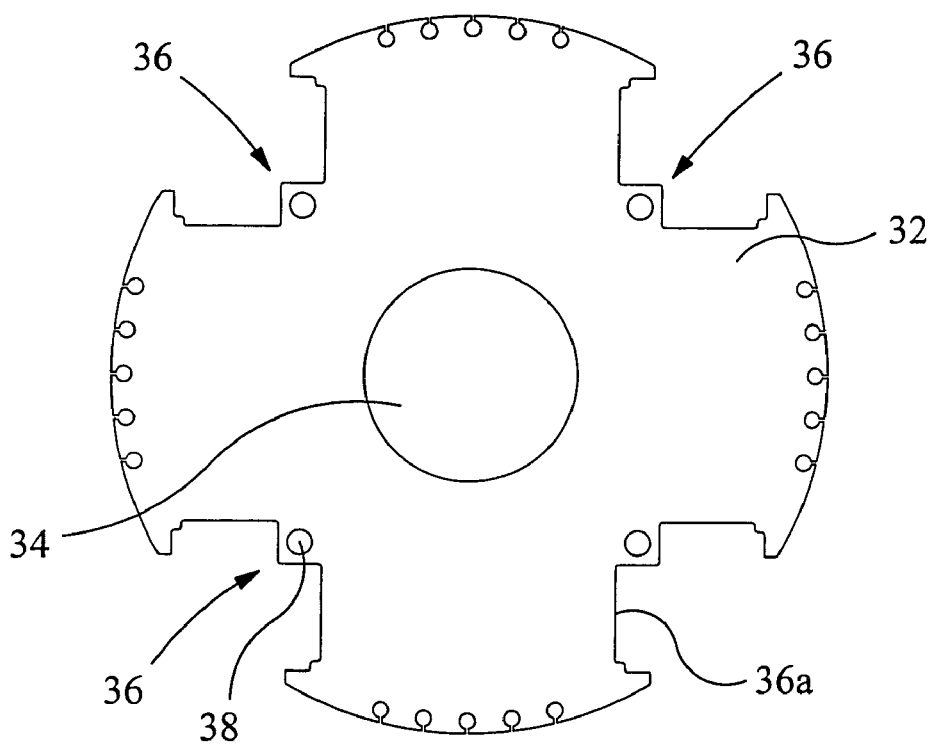
FIG. 3 is a view of one of the laminae of the rotor.

The rotor body 12 is made up of a series of laminations 32 of the form illustrated in FIG. 3. The lamninations 32 are stamped from sheets of iron, the stamping forming a central opening 34 receiving, in use, the rotor shaft 10, and four equiangularly spaced grooves 36 which together serve to form the four equiangularly spaced recesses 14 of the rotor body. The grooves 36 define recesses 36a which together form the recesses 16a of the rotor body. Adjacent each groove 36 between two adjacent recesses 36a is stamped an opening 38, the openings 38 together serving to form coolant passages 40, in the assembled rotor body 12, each coolant passage extending substantially parallel to the axis of the rotor body 12, and being located adjacent a space 42 between a pair of adjacent ones of the limbs 16 and adjacent windings 18. The openings 38 may, be of any suitable profile to accommodate the desired flow distribution in the coolant passages 40.

The parts of the rotor body 12 in which the coolant passages 40 are located are low stress regions and, in use, are also regions of very low magnetic flux. The provision of the coolant passages 40 therefore has little effect upon the strength or electrical operation of the machine.

Approximately mid-way along the length of the rotor body 12 are formed discharge passages 44, each discharge passage 44 extending substantially radially and providing a fluid communication path between one of the coolant passages 40 and the associated space 42. The discharge passages 44 are formed by wire erosion or by using a suitable drilling process after having assembled the laminations of the rotor body 12.

At one end of the rotor body 12, in this case the non-drive end, is provided an end plate 46 of shape substantially the same shape as the laminations 32, but in which the openings 38 are omitted. It will be appreciated that the end plate 46 serves to close the coolant passage 40 at that end of the rotor body 12. The other, drive, end of the rotor body 12 is provided with a distribution plate 48, the inner surface of the distribution plate 48 being provided with grooves or recesses of the form illustrated in FIG. 2. The recesses formed in the distribution end plate 48 comprise an annular recess 50 from which extend four equiangularly spaced, radially extending recesses 52, the outer end of which align with respective ones of the passages 40.

As illustrated in FIGS. 1 and 2, the rotor shaft 10 is provided with small diameter radially extending openings 54 extending from the hollow oil distribution interior of the rotor shaft 10 to the outer periphery of the rotor shaft 10 at positions aligning with the annular recess 50.

In use, cooling oil is supplied to the interior of the rotor shaft 10, and the cooling oil is able to pass through an oil jet 54 formed by the small diameter opening into the annular recess 50. From the annular recess 50, the cooling oil is able to flow along the radially extending recesses 52 to enter the coolant passages 40 formed in the rotor body 12. The oil is able to pass along the coolant passages 40 and to flow radially outwardly through the discharge passages 44 into the spaces 42. From the spaces 42, the coolant oil is able to enter the small cavities between the individual conductors of the windings 18, the oil incident upon the inner, secondary, wedges 28 flowing into these cavities under the action of centrifugal force. The oil flows along these cavities towards the ends of the rotor from where it can escape. It will be appreciated that the flow oil into, along and from the windings 18 serves to cool the windings 18 at positions intermediate the ends of the rotor.

Although in the illustrated embodiment the discharge passages 44 are all located at approximately the centre of the rotor 12, it will be appreciated that this need not be the case and that the discharge passages 44 could be located at other axial locations. Further, if desired more than one discharge passage 44 may be associated with each coolant passage 40.

The sizes of the oil jets 54 are chosen so as to control the flow rate at which coolant oil is supplied. If passages of the desired dimensions could be formed without the attendant risk of becoming blocked or diverting excessive oil flow from other regions, in use, then individual drillings could directly feed each of the radially extending recesses 52 thereby avoiding the need to provide the annular recess 50. However, it is currently envisaged in the present embodiment that the provision of individual openings would not be practical, and so two larger diameter, openings are provided.

As mentioned hereinbefore it has been found that the part of the rotor body 12 in which the coolant passages 40 are provided bears little of the centrifugal forces applied during use of the dynamo electric machine, and so the structural integrity of the rotor is not unduly affected by the provision of the coolant passages 40. Further, the parts of the rotor body 12 in which the coolant passages 40 are provided are also regions of very low magnetic flux, and so the electrical operation of the dynamo electric machine is not compromised.

During assembly of the individual laminations to form the rotor body, it will be appreciated that the coolant passages 40 may become blocked, and so may require unblocking and/or flushing prior to use. It will also be appreciated that the passages 40 may be of slightly rough form due to the openings in the individual laminations not properly aligning. However, given the relatively low coolant flow rates envisaged, the roughness of the passages and the consequent frictional oil loss is unlikely to be problematic.

It is envisaged that the rotor described and illustrated herein be used in a dynamo electric machine suitable for use in aerospace applications in which the rotor is intended to rotate at speeds of between 10,000 and 20,000 rpm. However, it will be appreciated that the dynamo electric machine may also be used in other applications and at higher or lower speeds.

Referring to FIGS. 5 to 7, another embodiment of the invention is illustrated. In this embodiment, the coolant passages 40 are omitted and instead the discharge passages 44 extend to the central opening 34 in with the rotor shaft 10 is received. Coolant oil from the oil distribution interior of the rotor shaft 10 is able to flow through the oil jets 54 to the exterior thereof from where it can enter the discharge passages 44 and flow to the associated spaces 42. As with the previously described embodiment, the coolant oil can then enter the small cavities between the conductors of the windings 18 and flow towards the ends of the rotor, thereby serving to cool the windings 18.

Clearly, the omission of the coolant passages 40 simplifies the stamping of the laminations, and also the specifically designed end plates to supply coolant to the passages 40 can be omitted.

Although, potentially, the discharge passages 44 could be formed by drilling, it is envisaged to incorporate, part way along the rotor body 12, a lamination plate 60 constructed of steel, one or both side surfaces 62 of which are provided with grooves 64 which are closed, in the assembled rotor body 12, by the adjacent laminations to define the discharge passages 44. The plate 60 includes an annular recess 66 adjacent the central opening 34 thereof which defines, with the adjacent lamination and the rotor shaft 10, an annular chamber to which the coolant is supplied through the oil jets 54. A short slot 68 is provided at the outlet of each oil jet 54 to accommodate tolerances in the positioning of the plate 60.

The plate 60, as well as serving to provide the discharge passages 44, may also be advantageous in that it may provide enhanced support for the wedges 20 and other components which extend longitudinally of the rotor body, and so enhance the structural integrity thereof.

It will be appreciated that the shape, size and cross-sectional profiles of the grooves 64 can be chosen to suit the application and desired coolant flow rate.

A range of modifications and alterations may be made to the arrangement described hereinbefore without departing from the scope of the invention.

The invention claimed is:

1. A rotor for a dynamo electric machine, the rotor comprising a rotor body defining a plurality of poles around which windings are provided, adjacent poles defining a space therebetween, and a wedge arrangement spanning the space between adjacent poles and serving to secure the windings in position, and a discharge passage for delivering coolant fluid to the said space, a coolant passage which extends substantially parallel to the axis of the body adjacent the said space, the discharge passage communicating with the coolant passage to device coolant fluid from the coolant passage to the said space, one end of the coolant passage being closed by an end plate, the other end being closed by a distribution plate formed with grooves defining passages to allow the distribution of coolant fluid to the coolant passage.

2. A rotor according to claim 1, wherein the wedge arrangement serves to divert coolant fluid from the said space into the windings.

3. A rotor according to claim 1, wherein the coolant fluid is oil.

4. A rotor according to claim 1, wherein the rotor body is of laminated form.

5. A rotor according to claim 4, wherein the discharge passage is defined by a groove formed in a surface of a plate located within the rotor body.

6. A rotor according to claim 5, wherein the groove extends radially.

7. A rotor according to claim 1, wherein the rotor body is of laminated form, and the coolant passage is defined by aligned apertures stamped into the individual lamina elements.

8. A rotor according to claim 1, further comprising an annulus situated in the end plate to ensure a minimum oil flow quantity to distribute oil symmetrically to all poles of the rotor.

9. A rotor according to claim 1, wherein the rotor contains several said spaces, and each said space has a coolant passage and discharge passage associated therewith.

10. A dynamo electric machine comprising a stator and a rotor supported for rotation relative to the stator, the rotor comprising a rotor body defining a plurality of limbs around which windings are provided, adjacent limbs defining a space therebetween, and a wedge arrangement spanning the space between adjacent limbs and serving to secure the windings in position, and a discharge passage for delivering coolant fluid to the said space, a coolant passage which extends substantially parallel to the axis of the body adjacent the said space, the discharge passage communicating with the coolant passage to deliver coolant from the coolant passage to the said space, one end of the coolant passage being closed by an end plate, the other end being closed by a distribution plate formed with grooves defining passages to allow the distribution of coolant fluid to the coolant passage.

* * * * *